United States Patent [19]
Mitchell et al.

[11] 4,063,342
[45] Dec. 20, 1977

[54] BRAKE SERVICE TOOL

[75] Inventors: Wallace F. Mitchell, Mettawa; Clifford A. Evans, Waukegan, both of Ill.

[73] Assignee: Ammco Tools, Inc., North Chicago, Ill.

[21] Appl. No.: 646,066

[22] Filed: Jan. 2, 1976

[51] Int. Cl.² .............................................. B23P 19/04
[52] U.S. Cl. ................................................... 29/227
[58] Field of Search ...................... 29/227, 225; 145/51

[56] References Cited
U.S. PATENT DOCUMENTS

| | | | |
|---|---|---|---|
| 1,325,383 | 12/1919 | Sontheimer | 145/51 |
| 2,042,287 | 5/1936 | Allievi et al. | 29/227 |
| 2,811,772 | 11/1957 | Johnson | 29/227 |
| 3,546,767 | 12/1970 | McFarland | 29/227 |

*Primary Examiner*—James L. Jones, Jr.
*Attorney, Agent, or Firm*—Edmond T. Patnaude

[57] ABSTRACT

A single hand tool for removing and applying the springs on automotive brake shoe assemblies includes at one end a member for removing and attaching retainer discs on the hold-down springs and also for removing the shoe-to-anchor springs, and at the other end a spring operated mechanism for attaching the shoe-to-anchor springs to the anchor pin of the brake assembly.

7 Claims, 8 Drawing Figures

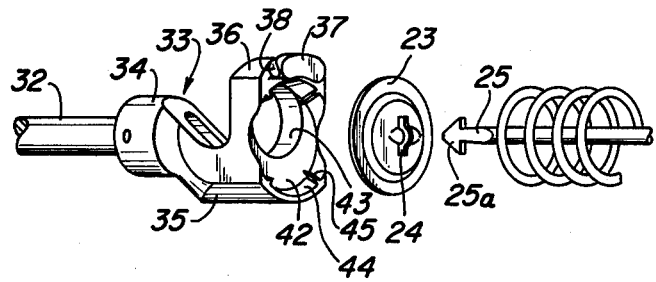
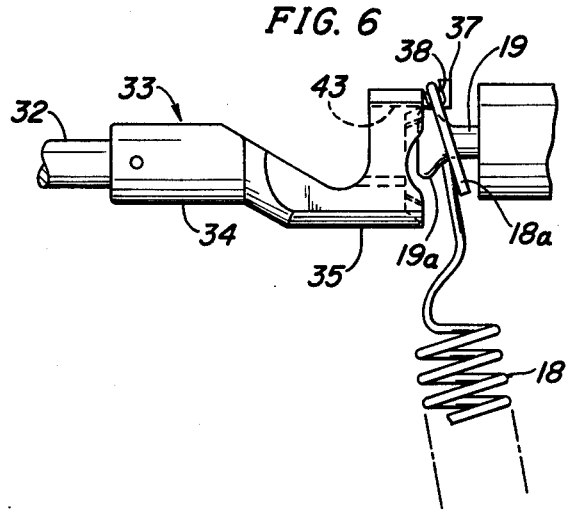
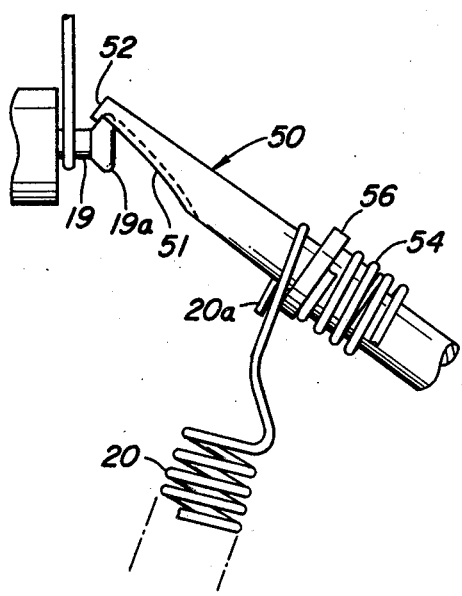
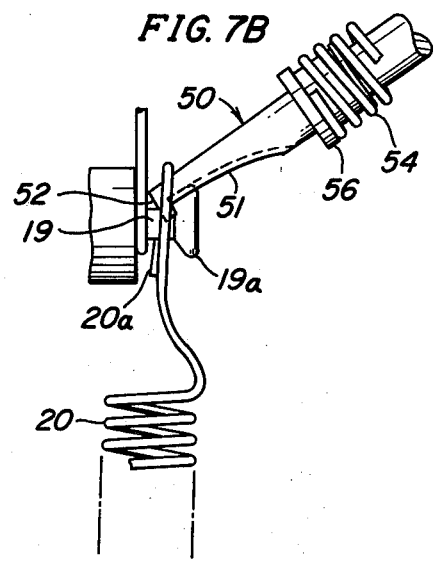

BRAKE SERVICE TOOL

The present invention relates in general to hand tools for applying and removing springs, and it relates in particular to a new and improved brake service tool adapted for use in installing brake shoes on the backing plate of a brake shoe assembly.

BACKGROUND OF THE INVENTION

When servicing shoe brakes of, for example, the so called Bendix type, it is necessary to remove and later replace the retainer discs on the hold-down springs and also to remove and later replace the shoe-to-anchor springs. In the past, two or three separate hand tools have been required to perform these several different operations. Such tools are relatively costly and easily lost or misplaced, wherefore a single tool for performing all of these different operations would be desirable. Moreover, the prior art brake service tools have not been entirely satisfactory from an operational point of view as, for example, in attaching the shoe-to-anchor springs to the anchor pin and in removing and attaching the hold down retainer discs. With many of the prior art tools it is necessary, or at least more convenient, for the mechanic to place his fingers on or in close proximity to the springs being removed or reapplied, and this procedure commonly results in injury to the mechanic's fingers particularly with the high spring rate springs now being used in automobile and truck brakes.

OBJECTS OF THE INVENTION

Therefore, a principal object of the present invention is to provide a new and improved tool for use in servicing shoe brakes.

Another object of the invention is to provide a new and improved tool for use in stretching and attaching a coil spring onto a pin or post.

A further object of this invention is to provide a unitary tool part for removing shoe-to-anchor springs from anchor pins and for assembling and disassembling retainer discs to shoe hold-down springs.

SUMMARY OF THE INVENTION

Briefly, there is provided in accordance with the present invention a single brake service tool having at one end a mechanism for use in stretching and installing shoe-to-anchor springs onto the anchor pin of the brake assembly and having at the other end an integral cast or molded part of novel configuration for use in removing shoe-to-anchor springs. The mechanism for installing the shoe-to-anchor springs includes a shank having an end shaped to fit on the anchor pin and a coil spring which surrounds the shank for pushing the end loop of a shoe-to-anchor spring off the shank onto the anchor pin as the shank is pivoted upwardly on the anchor pin.

BRIEF DESCRIPTION OF THE DRAWINGS

Further objects and advantages and a better understanding of the present invention can be had by reference to the following detailed description, wherein:

FIG. 5 is an exploded perspective view useful in understanding the use of the tool of the present invention for removing and replacing the retainer discs of shoe-hold-down springs;

FIG. 6 is a view illustrating the use of the tool of the present invention in removing a shoe-to-anchor spring from an anchor pin;

FIGS. 7A and 7B illustrate the use of the tool of the present invention in attaching the shoe-to-anchor springs to the anchor pin of the shoe brake assembly.

DETAILED DESCRIPTION OF THE INVENTION

Figure 1:
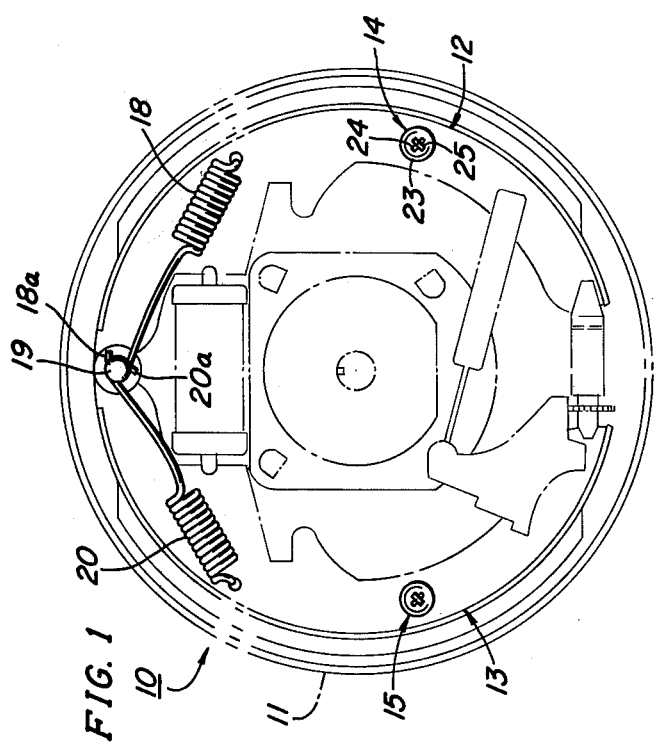
FIG. 1 is an elevational view partially in phantom of a shoe brake assembly with which the brake service tool of the present invention is adapted to be used.
Figure 3:
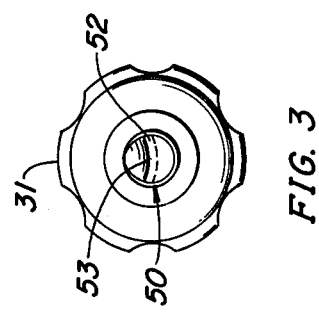
FIG. 3 is an end view of the tool of FIG. 2 taken from the line 3—3 thereof.
Figure 4:
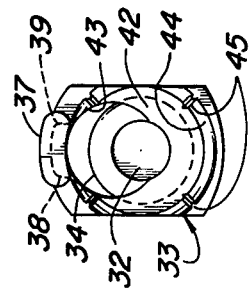
FIG. 4 is an end view of the tool of FIG. 2 taken from the line 4—4 at the righthand end thereof.

Referring now to the drawings and particularly to FIG. 1 thereof, there is shown a shoe brake assembly 10 comprising a stationary backing plate 11 to which a primary brake shoe 12 and secondary brake shoe 13 are mounted by a pair of shoe hold down spring assemblies 14 and 15 respectively. A primary shoe-to-anchor spring 18 is stretched between the primary brake shoe 12 and an anchor pin 19 extending forwardly from and affixed to the backing plate 11. A secondary shoe-to-anchor spring 20 is stretched between the brake shoe 13 and the anchor pin 19. As illustrated in the drawing, the springs 18 and 20 are tension coil springs which include open loops 18A and 20A respectively for gripping the anchor pin 19.

The shoe hold-down spring assemblies 14 and 15 are identical and each includes a retainer disc 23 provided with centrally disposed diametric slot 24. A compression coil spring (not visible in FIG. 1) is compressed between the disc 23 and the outer face of the brake shoe over a T-nail 25 which is secured at its inner end to the backing plate 11 and cooperates with the retainer disc 23 to maintain the hold-down spring in compressed condition against the associated shoe.

The remaining parts of the shoe brake assembly illustrated in phantom in FIG. 1 are well known to those skilled in the art, and since the construction and operation of such parts are not necessary to an understanding of the tool of the present invention, they are not further described herein. Suffice to say, however, that in order to service the shoe brake assembly 10 it is necessary to remove the shoe-to-anchor springs 18 and 20 from the anchor pin 10 and to remove the retainer discs 23 and associated hold down springs to permit removal of the brake shoes 12 and 13 and the remainder of the assembly.

Figure 2:
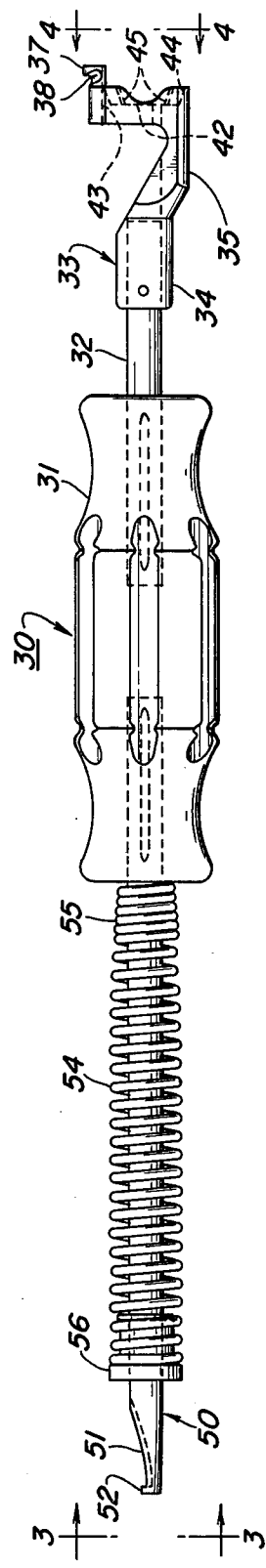
FIG. 2 is a side view of a brake service tool embodying the present invention.

Referring now to FIG. 2, there is shown a tool 30 embodying the present invention. It includes a central handle 31 from the right hand end which, as illustrated in FIG. 2, extends a shank 32. An integral molded or cast part 33 is secured to the distal end of the shank 32. Preferably the part 33 is removably secured to the shank 32 so as to permit replacement thereof in the event of damage. The single tool part 33 is used for three different purposes. It is used to remove the shoe-to-anchor springs 18 and 20 from the anchor pin 19 and two, it is used to remove the retainer discs 23 from the shoe holddown assemblies 14 and 15 and to install such retainer discs. The tool part 33 is best shown in FIGS. 2–6 and includes a tubular section 34 which fits onto the distal end of the shank 32. A semi cylindrical portion 35 is disposed between the tubular part 34 and a circular end portion 36 having a lug portion 37 provided with a pair of spiral grooves 38 and 39. A transverse wall portion 42 is spaced inwardly from the end of the part 33 and has a circular opening 43 therein, which opening 43 is offset from the center of the wall 32 but is coaxial with the spiral grooves 38 and 39 in the lug 37. A frustoconical inner surface 44 tapers inwardly at an angle of about 30° and has a mean diameter approximately equal to the diameter of the retainer disc 23. A plurality of sharp teeth 45 extend inwardly from the surface 44 to assure a tight grip of the washer 23 irrespective of circumferencetial irregularities thereof.

As shown in FIG. 6, in order to remove a retainer disc 23 the tool part 33 is pressed against the disc 23 to be removed so that the disc 23 fits into the circular recess at the end of the tool with the circumferential edge of the disc in tight engagement with the surface 44. Inasmuch as the surface 44 ia frustroconical, slight variations in the diametric dimensions of the retainer discs 23 are accommodated. The tool is then pressed forward a sufficient amount so that the head portion 25a of the hold down nail 25 is out of engagement with the rear surface of the disc 23. The tool is then rotated to rotate the disc 23 so as to align the slot 25 with the head 25a and the tool is then permitted to move outwardly to remove the disc from the nail 25. Inasmuch as the part 33 is of open construction the serviceman can observe through the opening 43 when the head 25a is aligned with the slot 24 in the retainer disc. Replacement of the retainer disc 23 is accomplished in much the same manner in that the disc is first placed in the open end of the part 33 and positioned in alignment with head 25a. The tool is then pressed forward to compress the hold-down spring and to move the outer surface of the retainer disc 23 clear of the head 25a. The tool is then rotated through 90° and pulled away leaving the hold-down assembly in assembled condition.

In order to remove the shoe-to-anchor springs, the tool part 33 is placed over the anchor pin 19 with such pin extending into the hold 43 and the lug 37 positioned in the open portion of the open spring loop 20a. The tool is then rotated counterclockwise to lift the loop 20a off the anchor pin. The procedure is then repeated to remove the spring 18. FIG. 6 illustrates the use of the tool in removing the spring 18. The two spiral grooves 38 and 39 enable the use of the tool irrespective of the direction of the open loop of the spring to be removed.

In order to replace the open loop ends of the shoe-to-anchor springs 18 and 20 on the anchor pin 19, the tool 30 comprises a rigid shank 50 extending from the end of the handle 31 opposite the shank 32 and is provided with a generally tapered end portion having a concave groove 51 therein, which end portion terminates in a lip 52 at the end. The lip 52 has a concave upper surface 53 which as best shown in FIG. 7A and 7B is adapted to fit over the generally conical upper surface of the anchor pin 19. A coil compression spring 54 is disposed over the shank 50 and fixed thereto near the handle by the more tightly wound inner end 55 of the spring. The normal internal diameter of the end 55 is less than the outer diameter of the shank 50 whereby to prevent the inner turns of the spring 54 from moving axially of the shank 50. A washer 56 is mounted on the shank 50 against the outer end of the spring 54 and has an inner diameter greater than the outer diameter of the shank 50 so as to be slideable thereon.

In order to use the tool 30 to connect a shoe-to-anchor spring to the anchor pin 19, the end portion of the shank 50 is placed in the open loop of the spring and the lip 52 is placed over the head 19a of the anchor pin 19 as shown in FIG. 7A. The normal dimension of the shoe to anchor spring 20 and the relative strength thereof relative to that of the spring 54 causes the spring 54 to be somewhat compressed as shown in FIG. 7A. The tool is then pivoted upwardly about the lip end to cause the open loop 20a to slide down the shank 50 over the head 19a onto the shank portion of the anchor pin 19. It has been found that springs of this type do not always slide freely on the shank 50 and in such cases the serviceman will commonly use his hand to push the spring along the shank. Pinched and otherwise injured fingers are not uncommon when this procedure is followed. In accordance with an important feature of the present invention the spring 54 provides a sufficient axial thrust to the open loop 20a toward the end of the shank 50 to obviate the need for applying an additional manual force to move the spring along the shank onto the anchor pin. An additional advantage obtained by the spring 54 is that the springs are not overstretched. When the spring 54 is not used, if the shoe-to-anchor does not freely slide along the shank, the spring may become overly stretched wherefore the brake assembly does not function properly thereafter. The spring 54 thus prevents injury to the serviceman as well as damage to the shoe-to-anchor springs.

There is thus provided in accordance with the present invention a relatively simple and thus inexpensive tool for disassembling and assembling brake shoes on the backing plates of brake shoe assemblies. The single tool may be used for removing and replacing all of the springs in a facile manner, and helps to avoid damage to the shoe-to-anchor springs and the other parts of a brake shoe assembly.

While the present invention has been described in connection with a single embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. A brake service tool, comprising
   a handle,
   a first rigid shank extending from said handle and having an offset lip at the distal end thereof,
   said lip having a concave edge for engaging the anchor pin of a shoe brake assembly,
   a second rigid shank extending from said handle,
   an integral member positioned at the distal end of said second shank,
   said integral member having an inwardly convergent frustoconical recess at the outer end for tightly receiving a hold-down spring retainer disc,
   said integral member having a transverse wall disposed inwardly of said recess and having an off-center circular hole therein for receiving the head of a brake shoe anchor pin, and
   said integral member having an external lug provided with a pair of oppositely directed spiral grooves, the axis of generation of said grooves being coaxial with the center of said circular hole.

2. A brake service tool according to claim 1 wherein said integral member is removably secured to said second shank.

3. A brake service tool according to claim 1 wherein, said first shank has a concave tapered portion adjacent said lip.

4. A brake service tool according to claim 1 comprising
an open wound coil spring disposed over said first shank and secured thereto at the inner end portion of said spring,
said spring having an unstressed length less than the length of said first shank, and
the distal outer end of said spring being disposed inwardly of and in proximity to said distal end of said first shank.

5. A brake service tool according to claim 1 wherein
said circular hole overlies the central portion of said conical recess to provide a window through which the head of a T-nail may be observed when said integral member is positioned over a spring retainer disc held in place by said T-nail.

6. A tool for attaching coil springs to a headed pin, comprising
a rigid shank having a laterally extending lip at one end, said lip having a concave edge,
an open turn coil spring disposed over said shank with the outer turns free to slide on said shank and the inner turns fixed thereto,
the outer end of said spring being in proximity to said lip when said spring is unstressed.

7. A tool according to claim 5, wherein
said rigid shank has a concave tapered portion adjacent said lip for receiving the head of said pin.

* * * * *